UNITED STATES PATENT OFFICE 2,263,749

POLYMETHINE DYES AND PROCESS FOR PREPARING THE SAME

Frank L. White and Grafton H. Keyes, Rochester, N. Y., assignors to Eastman Kodak Company, Rochester, N. Y., a corporation of New Jersey No Drawing. Original application April 23, 1937, Serial No. 138,634. Divided and this application September 3, 1938, Serial No. 228,448

14 Claims. (Cl. 260—240)

This invention relates to polymethine dyes and to a process for preparing the same.

Certain dyes are known to alter the sensitivity of photographic silver halide emulsions. For example, certain dyes of the cyanine class have been found to alter the sensitivity of photographic emulsions. Dyes of the merocyanine class (see United States Patent No. 2,078,233, dated April 27, 1937,) have been found to sensitize photographic emulsions. However, not all dyes alter the sensitivity of photographic emulsions. In order for a dye to sensitize a photographic silver halide emulsion, it must not only be adsorbed by the silver halide, but must be so adsorbed that a proper exchange of energy between the dye and the silver halide obtains. It is, of course, impossible to forecast whether or not a dye will be adsorbed on a silver halide and whether or not a dye will be adsorbed in a manner which permits the proper exchange of energy between the dye and silver halide.

We have now found an entirely new class of dyes and have further found that these dyes sensitize photographic emulsions in a new and useful manner. See our copending application Serial No. 138,634, filed April 23, 1937, (now United States Patent 2,166,736, dated July 18, 1939) of which the instant application is a division.

An object, therefore, of our present invention is to provide new dyes. A further object is to provide new photographic sensitizing dyes. A still further object is to provide a process for preparing such new dyes. Other objects will appear hereinafter.

The dyes of our invention can be illustrated by the following general formulas:

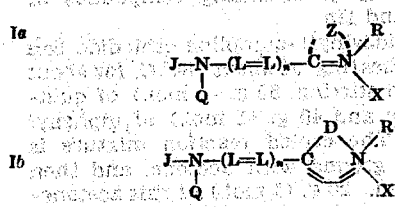

wherein D represents vinylene or phenylene groups, L represents a methylene group, $n$ represents a positive integer not greater than three, J represents hydrogen or an aliphatic group while Q represents an aliphatic group and J and Q together represent the non-metallic atoms necessary to complete a basic cyclic organic nucleus other than a pyrrol nucleus, R represents an alkyl group, X represents the acid radical of a monobasic acid and Z represents the non-metallic atoms necessary to complete an organic heterocyclic nucleus. The term "aliphatic group," is intended to include saturated as well as unsaturated aliphatic groups and to include also substituted aliphatic groups, such as benzyl, β-hydroxyethyl or the like.

Our new dyes are not to be confused with other known dyes having a somewhat related structure. For example, a dye having the formula:

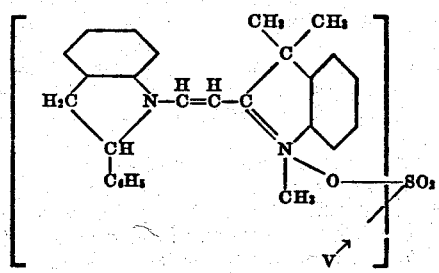

is known.

Such dyes as that formulated immediately above are inner quaternary salts. The valence bond designated as (V) is attached to some position in the formulated molecule. As clearly shown in Formulas Ia and Ib above, such inner quaternary salts are not contemplated in our invention. Furthermore, such inner quaternary salts cannot be made by the process we employ in preparing our new dyes, and such inner quaternary salts have properties distinct from those of our new dyes.

More particularly in Formulas Ia and Ib, J and Q can each represent an alkyl group, such as methyl, ethyl, n-butyl, allyl, benzyl, β-hydroxyethyl, furylmethyl (furfuryl) or the like and J and Q together can represent the non-metallic atoms necessary to complete an organic cyclic basic nucleus, such as piperidine, a tetrahydroquinoline, a N-alkylpiperazine, a piperazine, a morpholine or like nucleus. Z can represent the non-metallic atoms necessary to complete a five-membered heterocyclic nucleus, such as a thiazole nucleus, for example benzothiazole, 4-chloro-benzothiazole, 5-methylbenzothiazole, 4-methylthiazole, naphthothiazoles, 4-phenylthiazole, 4,5-diphenylthiazole or the like, an oxazole nucleus, for example benzoxazole, naphthoxazoles, 4-methyloxazole, 4-phenyloxazole or the like, a selenazole nucleus, for example benzoselenazole, a selenazole, 4-methylselenazole or 4-phenylselenazole, a 3,3-dialkylindolenine nucleus, for example 3,3-dimethylindoline; a thiazoline nucleus, a selenazoline nucleus, or the like, and Z can represent the non-metallic atoms necessary to complete a six-membered heterocyclic nucleus, such as a pyridine nucleus, a quinoline nucleus, for example 5-methylquinoline or benzoquinoline, or the like. X can represent halide, alkylsulfate, perchlorate, nitrate, p-toluenesulfonate or the like. R can represent alkyl groups such as methyl, ethyl, n-butyl, benzyl, allyl or the like.

Our new dyes can be prepared by reacting a basic primary or secondary non-aromatic amine, particularly a monoamine, with a compound of one of the following formulas:

IIa
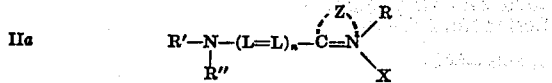

and

IIb
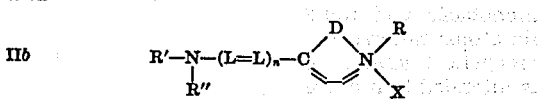

wherein D represents a vinylene or phenylene group, n represents a positive integer not greater than three, R' represents an acyl group, R'' represents an aryl group, R, X and Z have the values indicated above under Formulas Ia and Ib. More particularly, in Formulas IIa and IIb, R' can represent an acyl group, such as acetyl, propionyl, butyryl, benzoyl or the like and R'' can represent an aryl group, such as phenyl, napthyl, xylyl, diphenyl or the like, i. e., an aryl group containing not more than twelve nuclear carbon atoms, for example.

The basic non-aromatic primary or secondary amines are advantageously reacted with the compounds of Formula IIa or IIb in the presence of a diluent, such as a lower aliphatic alcohol, i. e., one of four carbon atoms or less. However, the diluent is not essential. Other diluents, such as ethylidene dichloride, ethylene dichloride or dioxane, can be used. The diluent should be inert toward the dyes and so chosen that the formed dye will separate therefrom at least upon cooling. Heat accelerates the formation of our new dyes. The non-aromatic primary or secondary amine is advantageously employed in molecular excess; from 1.5 to 3 molecular proportions (mol.) per molecular proportion of compound of Formulas IIa and IIb is suitable. With a molecular ratio of 1:1 the yield of our new dyes is generally lower than when an excess is employed.

Compounds of Formulas IIa and IIb can be prepared by reacting a cyclammonium quaternary salt containing a reactive alkyl group in the alpha or gamma position, i. e., one of the so-called reactive positions, with a compound of the following formula:

III
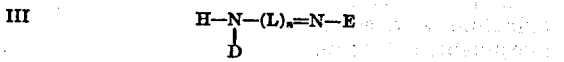

wherein L represents a methenyl group, n represents a positive odd integer not greater than five, D and E represent aryl groups, such as phenyl, naphthyl, xylyl, or the like. Some of the compounds represented by Formula III are basic and form salts with acid, such as hydrochloric, sulfuric and the like acids. These salts can be used as well to react with the above mentioned cyclammonium salts. Examples of compounds of Formula III and their salts which can advantageously be employed are: diphenylformamidine, β-anilinoacrolein anil, β-anilino-α-bromacrolein anil, β-anilino-α-chloroacrolein anil and their hydrochlorides, glutaconic aldehyde dianilide hydrochloride, α-(β-naphthylimino-ε-(β-naphthylamino)-α-methyl-α, γ-pentadiene hydrochloride (see König, Journal für praktische Chemie, vol. 69, page 136), etc. The compounds of Formula III can be reacted with cyclammonium quaternary salts containing a reactive alkyl group by mere heating of the reactants together, advantageously in the presence of acetic anhydride or the like. The cyclammonium quaternary salts which can be employed are those corresponding to the heterocyclic nuclei pointed out above under Formulas Ia and Ib, i. e. for example, quaternary salts of 1-methylbenzothiazole, 1-ethylbenzothiazole, μ-methylnaphthothiazoles, quinaldine, α- and γ-picolines, lepidine, 1-methylbenzoxazole, μ-methylnaphthoxazoles, 1-methylbenzoselenazole, 2,4-dimethylthiazole, 2-methyl-4-phenylthiazole, 2,3,3-trimethylindolenine, 2-methylthiazoline and the like.

The basic primary or secondary non-aromatic amines which can be reacted with compounds of Formulas IIa and IIb, are, for example, aliphatic amines, for instance monoalkylamines, such as methylamine, ethylamine, n-butylamine, sec-butylamine, isopropylamine, n-decylamines, cyclohexylamine, furfurylamine, tetrahydrofurfurylamine, β-hydroxyethyl amine, allylamine, benzylamine or the like or dialkylamines, such as dimethylamine, diethylamine, di-n-butylamine, di-sec-butylamine, di-isopropylamine, di-n-decylamines, difurfurylamine, di-β-hydroxyethyl-amine, dibenzylamine or the like or secondary basic heterocyclic amines, such as five-membered basic heterocyclic amines, for example, pyrrolidines or the like or six-membered basic heterocyclic amines, for example, piperidine, morpholine, 1,2,3,4-tetrahydroquinolines, piperazine, N-alkyl-piperazines or the like. Pyrrol cannot be used in our process.

Reaction products of compounds of Formula III with such cyclammonium quaternary salts prepared in the presence of acetic anhydride or the like are the acylated compounds of Formulas IIa and IIb. When prepared in the absence of acetic anhydride or the like, the reaction products must be acylated by treatment with acylating agents, such as acid anhydrides or acid chlorides, e. g. acetic, propionic, or benzoic anhydrides. We have found the acetylated compounds are particularly useful in preparing our new dyes.

The following procedures will serve to illustrate the manner of obtaining compounds of Formulas IIa and IIb.

2-(β-acetanilidovinyl)-quinoline ethiodide can be prepared by heating, at about 180° C. for about 10 minutes with stirring, 60 g. (1 mol.) of quinaldine ethiodide and 40 g. (1 mol.) of diphenyl formamidine. The cooled reaction mixture is advantageously ground with acetone, and then filtered and dried. 20 g. (1 mol.) of this acetone-treated reaction product was refluxed in about 50 cc. of acetic anhydride for about 10 minutes. The reaction mixture was chilled and the 2-(β-acetanilidovinyl)-quinoline ethiodide which separated was filtered off and washed with acetone.

2-(β-acetanilidovinyl)-thiazoline methiodide can be prepared by heating, at about 100° C. for about 15 minutes, an intimately ground mixture of 159 g. (1 mol.) of 2-methylthiazoline methiodide and 135 g. (1.05 mol.) of diphenylformamidine in about 220 cc. of glacial acetic acid. The reaction product separated from the cooled reaction mixture. It was refluxed, for about 15 minutes in sufficient acetic anhydride to form a solution. One molecular proportion of pyridine for each molecular proportion of reaction product is advantageously employed in the solution during refluxing. The 2-(β-acetanilidovinyl)-thiazoline methiodide was precipitated from solution by adding diethyl ether. The precipitated tarry mass was stirred with acetone until crystalline.

1-(β-acetanilidovinyl)-benzothiazole ethiodide can be prepared by refluxing, for about 20 minutes, 48 g. (1 mol.) of diphenylformamidine and 67 g. (1 mol.) of 1-methylbenzothiazole ethiodide in about 365 cc. of acetic anhydride. The 1-(β-acetanilidovinyl)-benzothiazole ethiodide separated from the chilled reaction mixture and was washed with acetone and dried.

1-(β-acetanilidovinyl)-benzoxazole ethiodide can be prepared by refluxing, for about 20 minutes, 40 g. (1 mol.) of diphenylformamidine and 58 g. (1 mol.) of 1-methylbenzoxazole ethiodide in about 250 cc. of acetic anhydride. The 1-(β-acetanilidovinyl)-benzoxazole ethiodide separated from the chilled reaction mixture and was washed with acetone and dried.

4-(β-acetanilidovinyl)-quinoline ethiodide can be prepared by heating, at 150° C. to 160° C. with stirring, an intimate mixture of 29.9 g. (1 mol.) of lepidine ethiodide and 19.6 g. (1 mol.) of diphenylformamidine for about 10 minutes. The cooled reaction mass was stirred with acetone and the acetone-treated reaction product then refluxed in sufficient acetic anhydride to form a solution, for about 15 minutes. One molecular proportion of pyridine for each molecular proportion of reaction product is advantageously employed in the solution during refluxing. The 4-(β-acetanilidovinyl)-quinoline ethiodide was precipitated from solution by adding diethyl ether. The precipitated product was stirred with acetone and dried.

1-(4-acetanilido-$\Delta^{1,3}$-butadienyl)-benzothiazole ethiodide can be prepared by refluxing, for about one hour, 30.5 g. (1 mol.) of 1-methylbenzothiazole ethiodide and 25.9 g. (1 mol.) of β-anilinoacrolein anil hydrochloride in about 250 cc. of acetic anhydride. The 1-(4-acetanilido) compound separated from the chilled reaction mixture. It was filtered, washed with acetone and dried.

2-(4-acetanilido-$\Delta^{1,3}$-butadienyl)-quinoline ethiodide can be prepared by refluxing, for about one hour, 3 g. (1 mol.) of quinaldine ethiodide and 2.5 g. (1 mol.) of β-anilinoacrolein anil hydrochloride in about 20 cc. of acetic anhydride. The reaction mixture was chilled and the acetanilido compound precipitated by adding two volumes (about 40 cc.) of diethyl ether. The acetanilido compound was washed with water and acetone.

1-(4-acetanilido-$\Delta^{1,3}$-butadienyl)-benzoxazole ethiodide can be prepared by refluxing, for about one hour, 2.9 g. (1 mol.) of 1-methylbenzoxazole ethiodide and 2.5 g. (1 mol.) of β-anilinoacrolein anil hydrochloride in about 20 cc. of acetic anhydride. The reaction mixture was chilled and the acetanilido compound precipitated with two volumes (about 40 cc.) of diethyl ether. The tarry precipitate was stirred with acetone until crystalline.

1-(6-acetanilido-$\Delta^{1,3,5}$-hexatrienyl)-benzoxazole ethiodide can be prepared by refluxing, for about 5 minutes, 5.5 g. (1 mol.) of glutaconic aldehyde dianilide hydrochloride and 5.8 g. (1 mol.) of 1-methylbenzoxazole ethiodide in about 25 cc. of acetic anhydride. The reaction mixture was chilled and the acetanilido-compound precipitated by adding diethyl ether. The precipitate was purified by stirring with acetone.

1-(6-acetanilido-$\Delta^{1,3,5}$-hexatrienyl)-α-naphthoxazole ethiodide can be prepared by refluxing, for about 5 minutes, 3.4 g. (1 mol.) of 1-methyl-α-naphthoxazole ethiodide and 2.8 g. (1 mol.) of glutaconic aldehyde dianilide hydrochloride in about 40 cc. of acetic anhydride. The acetanilido compound separated from the chilled reaction mixture. It was washed with acetone.

Still further illustrations of the preparation of these dye-intermediates will be found in the following examples.

Compounds of Formula III where $n$ represents one can be prepared as described by Claisen in Annalen, vol. 287, page 366 (1895) and by Comstock & Wheeler in the American Chemical Journal, vol. 13, page 516 (1891) and by Dains in the Berichte der deutschen chemischen Gesellschaft, vol. 35, 2498–2501 (1902). Compounds of Formula III where $n$ represents three can be prepared as described by Reitzenstein & Bönitsch in the journal für praktische chemie, vol. 86, page 1 (1912) and by Dieckmann & Platz in the Berichte der deutschen chemischen Gesellschaft, vol. 37, pages 4635–4638 (1904). Compounds of Formula III wherein $n$ represents five can be prepared as described by Zincke in Annalen, vol. 330, page 361 (1904) and by Zincke, Heuser & Möller in Annalen, vol. 333, page 296 (1904) and by Zincke & Würker in Annalen, vol. 338, page 107 (1905) and by König in journal für praktische chemie, (2) vol. 69, page 129 and (2) vol. 70, pages 23 and 52.

By the term "non-aromatic amine," we mean an amine in which the amino group is not directly attached to a benzene or equivalent aromatic ring system as the amino group is in aniline, methylaniline, α- and β-naphthylamines, 1-aminoanthraquinone, α-aminopyridine, 5-aminoquinoline or the like.

While the process of preparing our new dyes is subject to variation, particularly as respects the nature and quantities of the reactants, the nature and quantity of the diluent and the temperatures, the following examples serve to illustrate the mode of practicing the preparation of our new dyes of Formulas Ia and Ib where $n$ represents one. These examples are not intended to limit our invention.

EXAMPLE 1.—*1-[β-(4-morpholyl)-vinyl]-benzoxazole ethiodide*

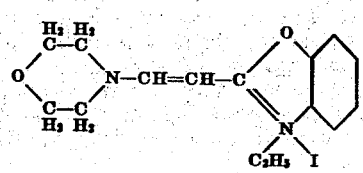

2.2 g. (1 mol.) of 1-(β-acetanilidovinyl)-benzoxazole ethiodide, 1.2 g. (3 mol.) of morpholine and 15 cc. of absolute ethyl alcohol were refluxed for about thirty minutes. The dye separated from the cooled reaction mixture and after twice recrystallizing from ethyl alcohol was obtained as pale yellow crystals melting at 211–213° C. Its ethyl alcoholic solution is colorless.

EXAMPLE 2.—*1 - [β-(1-piperidyl) - vinyl]-benzothiazole ethiodide*

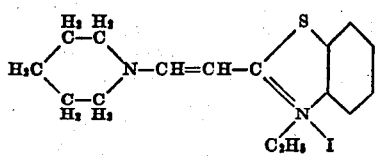

1.1 g. (1 mol.) of 1-(β-acetanilidovinyl)-benzothiazole ethiodide, 0.6 g. (3 mol.) of piperidine and 10 cc. of absolute ethyl alcohol were refluxed for about 30 minutes. The dye separated from the cooled reaction mixture and after twice recrystallizing from methyl alcohol was obtained as light yellow crystals melting at 274–277° C. with decomposition. Its methyl alcoholic solution was pale yellow.

EXAMPLE 3.—*1-[β-(4 - morpholyl - vinyl]-benzothiazole ethiodide*

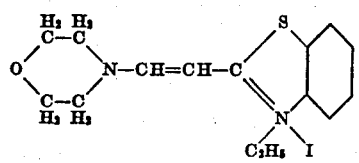

1.1 g. (1 mol.) of 1-(β-acetanilidovinyl)-benzothiazole ethiodide, 0.7 g. (3 mol.) of morpholine and 20 cc. of absolute ethyl alcohol were refluxed for about 30 minutes. The dye separated from the cooled reaction mixture and after twice recrystallizing from methyl alcohol was obtained as yellow crystals melting at 263–265° C. with decomposition. Its methyl alcoholic solution was pale yellow.

EXAMPLE 4.—*2-[β-(1-piperidyl) - vinyl]-β-naphthothiazole ethiodide*

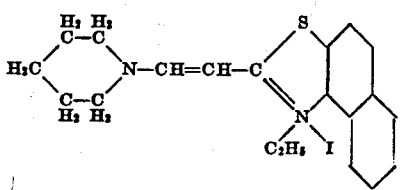

2.5 g. (1 mol.) of 2-(β-acetanilidovinyl)-β-naphthothiazole ethiodide, 1.2 g. (3 mol.) of piperidine and 25 cc. of absolute ethyl alcohol were refluxed for about 30 minutes. The dye separated from the cooled reaction mixture and after twice recrystallizing from methyl alcohol was obtained as brownish yellow crystals melting at 230–232° C. with decomposition. Its methyl alcoholic solution was pale yellow.

2 - (β - acetanilidovinyl) - β - naphthothiazole ethiodide can be made by refluxing 3.5 g. (1 mol.) of 2-methyl-β-naphthothiazole ethiodide, 1.9 g. (1 mol.) of diphenylformamidine and 7 cc. of acetic anhydride for about 20 minutes. The reaction mixture was chilled and the solid product which separated was filtered, washed with water and acetone and dried. Upon recrystallization from acetic acid, it melted at 180° C. with decomposition.

EXAMPLE 5.—*2-[β-(1-piperidyl)-vinyl]-quinoline ethiodide*

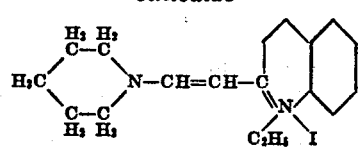

1.1 g. (1 mol.) of 2-(β-acetanilidovinyl)-quinoline ethiodide, 0.6 g. (3 mol.) of piperidine and 20 cc. of absolute ethyl alcohol were refluxed for about 30 minutes. The dye separated from the cooled reaction mixture and after twice recrystallizing from methyl alcohol was obtained as yellow crystals melting at 253–255° C. with decomposition. Its methyl alcoholic solution was yellow.

In the above five examples, the piperidine and morpholine can be replaced with any basic non-aromatic primary or secondary amine such as pointed out above in connection with reaction with compounds of Formulas IIa and IIb. Likewise, the 1 - (β - acetanilidovinyl) - benzoxazole ethiodide, 1-(β-acetanilidovinyl) - benzothiazole ethiodide, 2 - (β - acetanilidovinyl) - β-naphthothiazole ethiodide and 2-(β-acetanilidovinyl)-quinoline ethiodide can be replaced by other quaternary salts, such as butiodides, alkyl sulfates, alkyl-p-toluenesulfonate or the like, as well as by acetanilidovinyl derivatives of cyclammonium alkyl quaternary salts of bases corresponding to the nuclei pointed out above under Formulas Ia and Ib.

The following examples serve to illustrate the mode of preparation of our new dyes of Formulas IIa and IIb where n equals two. These examples are not intended to limit our invention.

EXAMPLE 6.—*1-[4-(1-piperidyl)-Δ¹,³-butadienyl]-benzothiazole ethiodide*

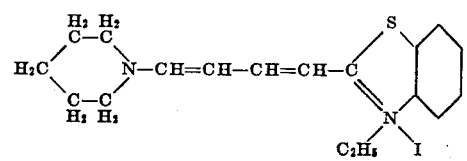

2.4 g. (1 mol.) of 1-(4-acetanilido-Δ¹,³-butadienyl)-benzothiazole ethiodide, 1.2 g. (3 mol.) of piperidine and 25 cc. of absolute ethyl alcohol were refluxed for about 30 minutes. The dye separated from the cooled reaction mixture and after recrystallizing from methyl alcohol was obtained as minute orange-red crystals melting at 205–207° C. with decomposition. Its methyl alcoholic solution was deep yellow.

EXAMPLE 7.—*1-[4-(4-morpholyl)-Δ¹,³-butadienyl]-benzothiazole ethiodide*

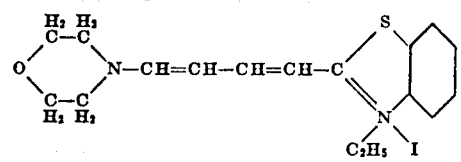

1.2 g. (1 mol.) of 1-(4-acetanilido-Δ¹,³-butadienyl)-benzothiazole ethiodide, 0.7 g. (3 mol.) of morpholine and 20 cc. of absolute ethyl alcohol were refluxed for about 30 minutes. The dye separated from the cooled reaction mixture and after twice recrystallizing from methyl alcohol was obtained as minute reddish crystals melting at 248–251° C. with decomposition. Its methyl alcoholic solution was deep yellow.

EXAMPLE 8.—*1-(4-di-β-hydroxyethylamino-Δ¹,³-butadienyl)-benzothiazole ethiodide*

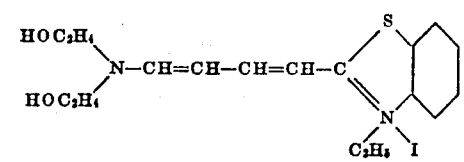

1.2 g. (1 mol.) of 1-(4-acetanilido-Δ¹,³-butadienyl)-benzothiazole ethiodide, 0.8 g. (3 mol.) of diethanolamine and 20 cc. of absolute ethyl alcohol were refluxed for about 30 minutes. The dye separated from the cooled reaction mixture, and after two recrystallizations from methyl alcohol was obtained as bluish crystals melting at 210° to 212° C. with decomposition. Its methyl alcoholic solution was yellow.

EXAMPLE 9.—*1-(4-di-n-butylamino-Δ¹,³-butadienyl)-benzothiazole ethiodide*

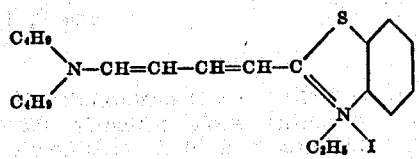

1.2 g. (1 mol.) of 1-(4-acetanilido-Δ¹,³-butadienyl)-benzothiazole ethiodide, 0.9 g. (3 mol.) of di-n-butylamine and 10 cc. of absolute ethyl alcohol were refluxed for about 30 minutes. The dye separated from the cooled reaction mixture and after two recrystallizations from ethyl acetate was obtained as reddish crystals with a blue reflex and melting at 150° to 152° C. with decomposition. Its ethyl acetate solution was golden yellow.

EXAMPLE 10.—*1 - (4 - diethylamino-Δ¹,³ - butadienyl)-benzothiazole ethiodide*

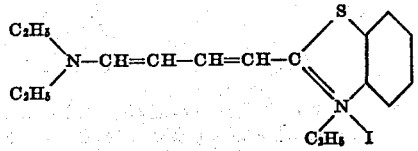

1.2 g. (1 mol.) of 1-(4-acetanilido-Δ¹,³-butadienyl)-benzothiazole ethiodide, 0.6 g. (3 mol.) of diethylamine and 15 cc. of absolute ethyl alcohol were refluxed for 30 minutes. The dye separated from the cooled reaction mixture and was twice recrystallized from acetone. The dye was obtained as minute reddish needles melting at 209° to 211° C. with decomposition. The dye gave a deep yellow solution in acetone.

EXAMPLE 11.—*1-(4-dibenzylamino-Δ¹,³-butadienyl)-benzothiazole ethiodide*

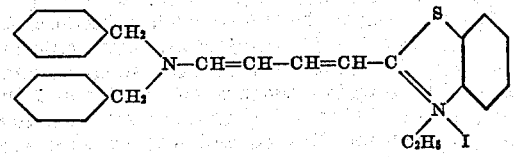

1.2 g. (1 mol.) of 1-(4-acetanilido-Δ¹,³-butadienyl)-benzothiazole ethiodide, 1.0 g. (2 mol.) of dibenzylamine and 10 cc. of absolute ethyl alcohol were refluxed for about 30 minutes. The dye separated from the cooled reaction mixture and after two recrystallizations from methyl alcohol was obtained as minute orange crystals melting at 221° to 223° C. with decomposition. Its methyl alcoholic solution was a deep yellow.

EXAMPLE 12.—*1-(4-diallylamino-Δ¹,³-butadienyl)-benzothiazole ethiodide*

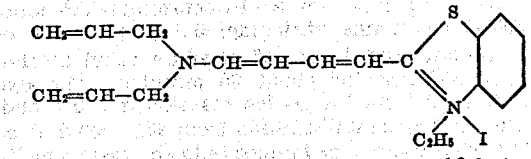

1.2 g. (1 mol.) of 1-(4-acetanilido-Δ¹,³-butadienyl)-benzothiazole ethiodide, 0.75 g. (3 mol.) of diallylamine and 15 cc. of absolute ethyl alcohol were refluxed for about 30 minutes. The dye separated from the cooled reaction mixture and after successive recrystallizations from methyl alcohol and then ethyl acetate was obtained as dull reddish crystals melting at 164° to 166° C. with decomposition. Its ethyl acetate solution was a deep yellow.

1-(4-acetanilido-Δ¹,³-butadienyl) - benzoxazole ethiodide can be prepared by refluxing 2.9 g. (1 mol.) of 1-methylbenzoxazole ethiodide, 2.5 g. (1 mol.) of β-anilinoacrolein anil hydrochloride and 30 cc. of acetic anhydride for about 60 minutes. The reaction mixture was chilled and 50 cc. of diethyl ether added. The ether-mixture was allowed to stand 12 hours in an ice-box when a tarry precipitate formed. The ether was decanted and the residue stirred with acetone (100 cc.). The tarry mass dissolved and upon standing crystals separated. These crystals were filtered off, washed with acetone and dried.

EXAMPLE 13.—*1 - [4 - (1 - piperidyl)-Δ¹,³-butadienyl]-benzoxazole ethiodide*

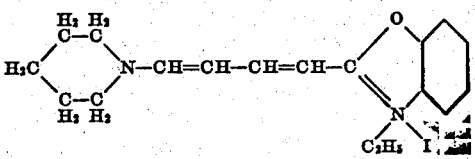

1.1 g. (1 mol.) of 1-(4-acetanilido-Δ¹,³-butadienyl)-benzoxazole ethiodide, 0.6 g. (3 mol.) of piperidine and 15 cc. of absolute ethyl alcohol were refluxed for about 30 minutes. The dye separated from the cooled reaction mixture and after two recrystallizations from ethyl alcohol was obtained as minute yellow crystals melting at 192° to 195° C. with decomposition. Its solution in ethyl alcohol was yellow.

EXAMPLE 14.—*1-[4-(6 - methoxy - 1 - tetrahydroquinolyl)-Δ¹,³-butadienyl]-benzothiazole ethiodide*

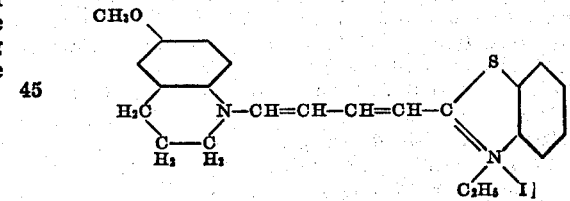

1.2 g. (1 mol.) of 1-(4-acetanilido-Δ¹,³-butadienyl)-benzothiazole ethiodide, 0.4 g. (1 mol.) of 1,2,3,4-tetrahydro-6-methoxy quinoline and 20 cc. of absolute ethyl alcohol were refluxed for about 30 minutes. The dye separated from the cooled reaction mixture and after two recrystallizations from methyl alcohol was obtained as minute greenish crystals melting at 252° to 254° C. with decomposition. Its methyl alcoholic solution was bluish-red.

EXAMPLE 15.—*1-(4-n-butylamino-Δ¹,³-butadienyl)-benzothiazole ethiodide*

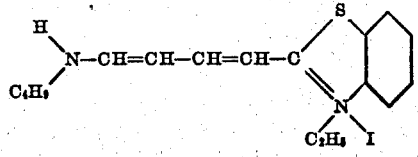

2.4 g. (1 mol.) of 1-(4-acetanilido-Δ¹,³-butadienyl)-benzothiazole ethiodide, 1.0 g. (3 mol.) of n-butylamine and 10 cc. of absolute ethyl alcohol were refluxed for about 30 minutes. The dye separated from the cooled reaction mixture and after two recrystallizations from methyl alcohol was obtained as minute brownish crystals melting at 174.5° to 176.5° C. with decomposition. Its methyl alcohol solution was brownish yellow.

EXAMPLE 16. — 1-(4-di-tetrahydrofurfurylamino-Δ¹,³-butadienyl)-benzothiazole ethoperchlorate

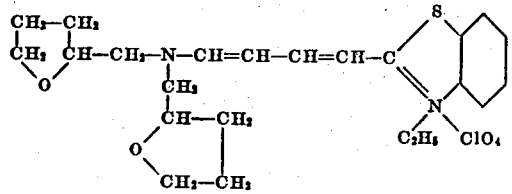

2.4 g. (1 mol.) of 1-(4-acetanilido-Δ¹,³-butadienyl)-benzothiazole ethiodide, 2.7 g. (3 mol.) of ditetrahydrofurfuryl-amine and 10 cc. of absolute ethyl alcohol were refluxed for about 30 minutes. The dye was precipitated by chilling the reaction mixture and adding thereto 20 cc. of ethyl acetate. The precipitated dye-iodide was dissolved in 10 cc. of methyl alcohol and 0.65 g. (1 mol. plus 10% excess) of sodium perchlorate. The dye-perchlorate precipitated. It was twice recrystallized from methyl alcohol and obtained as bright orange crystals melting at 202.5° to 204.5° C. with decomposition. Its methyl alcoholic solution was golden yellow.

EXAMPLE 17.—2-(4-diethylamino-Δ¹,³-butadienyl)-β-naphthothiazole ethiodide

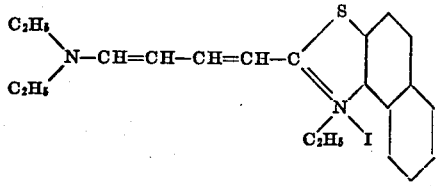

1.3 g. (1 mol.) of 2-(4-acetanilido-Δ-¹,³-butadienyl)-β-naphthothiazole ethiodide, 0.6 g. (3 mol.) of diethylamine and 10 cc. of absolute ethyl alcohol were refluxed for about 30 minutes. The dye separated from the cooled reaction mixture and was recrystallized from 95% ethyl alcohol and obtained as dark greenish crystals melting at 205° to 208° C. with decomposition. Its ethyl alcoholic solution was pinkish-orange.

2-(4-acetanilido-Δ¹,³-butadienyl)-β-naphthothiazole ethiodide was prepared by refluxing 3.5 g. (1 mol.) of 2-methyl-β-napthothiazole ethiodide, 2.5 g. (1 mol.) of β-anilinoacrolein anil hydrochloride and 20 cc. of acetic anhydride for about 60 minutes. The reaction mixture was chilled and the product precipitated by adding ether (60 cc.). The product was stirred with acetone, filtered, washed with acetone and dried.

EXAMPLE 18. — 2-(4-ditetrahydrofurfurylamino-Δ¹,³-butadienyl)-β-naphthothiazole ethiodide

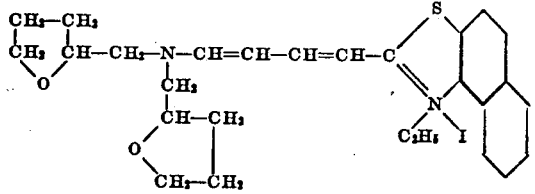

1.3 g. (1 mol.) of 2-(4-acetanilido-Δ-¹,³-butadienyl)-β-napthothiazole ethiodide, 1.35 g. (3 mol.) of ditetrahydrofurfurylamine and 10 cc. of absolute ethyl alcohol were refluxed for about 30 minutes. The dye separated from the cooled reaction mixture and after two recrystallizations from methyl alcohol was obtained as dark reddish-purple crystals melting at 133.5° to 135.5° C. Its methyl alcoholic solution was pinkish.

EXAMPLE 19.—2 - [4 - (1-piperidyl)-Δ¹,³ - butadienyl]-β-naphthothiazole ethiodide

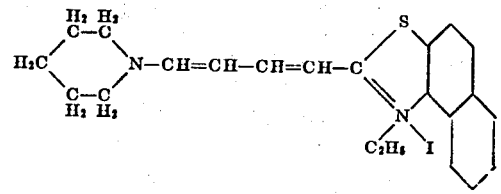

1.3 g. (1 mol.) of 2-(4-acetanilido-Δ¹,³-butadienyl)-β-naphthothiazole ethiodide, 0.6 g. (3 mol.) of piperdine and 10 cc. of absolute ethyl alcohol were refluxed for about 30 minutes. The dye separated from the cooled reaction mixture and after two recrystallizations from methyl alcohol was obtained as reddish crystals melting at 148° to 151° C. with decomposition. Its methyl alcoholic solution was purplish-orange.

EXAMPLE 20—1-(4-diethylamino-Δ¹,³-butadienyl)-benzoselenazole ethiodide

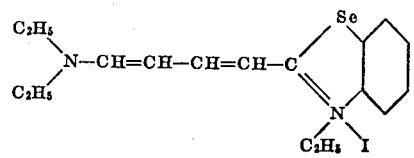

2.6 g. (1 mol.) of 1-(4-acetanilido-Δ¹,³-butadienyl)-benzoselenazole ethiodide, 0.6 g. (3 mol). of diethylamine and 15 cc. of absolute ethyl alcohol were refluxed for about 30 minutes. The dye separated from the cooled reaction mixture and after two recrystallizations from acetone and one recrystallization from a solvent composed of one part by volume ethyl alcohol and three parts ethyl acetate, the dye was obtained as minute reddish crystals melting at 120° to 122° C. with decomposition. Its ethyl acetate-ethyl alcohol solution was a deep yellow.

1-(4-acetanilido-Δ¹,³-butadienyl)-benzoselenazole ethiodide was prepared by refluxing 3.5 g. (1 mol.) of 1-methyl-benzoselenazole ethiodide, 2.5 g. (1 mol.) of β-anilinoacrolein anil hydrochloride and 20 cc. of acetic anhydride for about 45 minutes. The reaction mixture was chilled and the product precipitated by adding diethyl ether. The product was filtered and washed with acetone.

EXAMPLE 21.—2-[4-(1 - piperidyl) - Δ¹,³ - butadienyl]-quinoline ethiodide

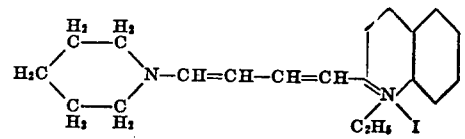

1.1 g. (1 mol.) of 2-(4-acetanilido-Δ¹,³-butadienyl)-quinoline ethiodide, 0.6 g. (3 mol.) of piperidine and 15 cc. of absolute ethyl alcohol were refluxed for about 30 minutes. The dye separated from the cooled reaction mixture and, after two recrystallizations from 95% ethyl alcohol, was obtained as minute reddish crystals melting at 237° to 239° C. with decomposition. Its ethyl alcoholic solution was pinkish-orange.

EXAMPLE 22.—*4-[4-(1-piperidyl)-Δ¹,³-butadienyl]-quinoline ethiodide*

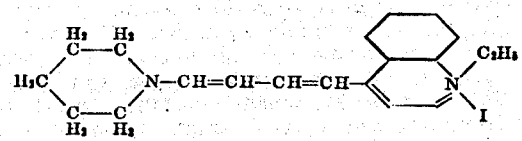

2.2 g. (1 mol.) of 4-(4-acetanilido-Δ¹,³-butadienyl)-quinoline ethiodide, 1.2 g. (3 mol.) of piperidine and 5 cc. of absolute ethyl alcohol were refluxed for about 30 minutes. The dye separated from the cooled reaction mixture and, after two recrystallizations from acetone, was obtained as minute greenish crystals melting at 204° to 206° C. with decomposition. Its ethyl alcoholic solution was bluish-red.

4-(4-acetanilido-Δ¹,³-butadienyl)-quinoline ethiodide was prepared by refluxing 6 g. (1 mol.) of lepidine ethiodide, 5 g. (1 mol.) of β-anilinoacrolein anil hydrochloride and 30 cc. of acetic anhydride for about 30 minutes. Reaction mixture was chilled and 100 cc. of diethyl ether added. Ether decanted and product stirred with acetone. Filtered, washed with acetone and dried.

EXAMPLE 23.—*1,4-di-[4-(1-benzothiazyl)-Δ¹,³-butadienyl] piperazine diethiodide*

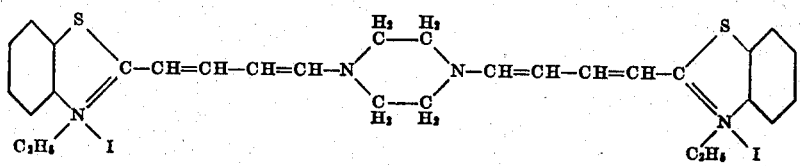

1.2 g. (2 mol.) of 1-(4-acetanilido-Δ¹,³-butadienyl)-benzothiazole ethiodide, 0.25 g. (2 mol.) of piperazine hexahydrate and 20 cc. of absolute ethyl alcohol were refluxed for about 30 minutes. The dye separated from the cooled reaction mixture and after recrystallization from methyl alcohol was obtained as minute reddish crystals melting at 303° to 305° C. with decomposition. Its methyl alcoholic solution was pinkish-orange.

EXAMPLE 24.—*1,4-di-[4-(1-benzoxazyl-Δ¹,³-butadienyl]-piperazine diethiodide*

2.3 g. (2 mol.) of 1-(4-acetanilido-Δ¹,³-butadienyl) benzoxazole ethiodide, 0.5 g. (2 mol.) of piperazine hexahydrate and 30 cc. of absolute ethyl alcohol were refluxed for about 30 minutes. The dye separated from the cooled reaction mixture and after recrystallization twice from methyl alcohol was obtained as brownish-orange crystals melting at 298° to 300° C. with decomposition. Its methyl alcoholic solution was deep yellow.

EXAMPLE 25.—*1,4-di-[4-(2-quinolyl)-Δ¹,³-butadienyl]-piperazine diethiodide*

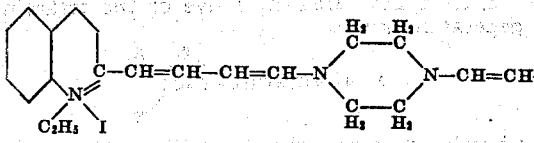

2.2 g. (2 mol.) of 2-(4-acetanilido-Δ¹,³-butadienyl)-quinoline ethiodide, 0.5 g. (2 mol.) of piperazine hydrate and 20 cc. of absolute ethyl alcohol were refluxed for about 30 minutes. The dye separated from the cooled reaction mixture and was twice recrystallized from methyl alcohol and obtained as brownish-purple crystals melting at 287° to 289° C. with decomposition. Its methyl alcoholic solution was deep crimson.

In the above twenty examples, the piperidine, morpholine, butylamine, diethylamine, diallylamine, dibutylamine, ditetrahydrofurfurylamine, dibenzylamine, piperazine and tetrahydroquinoline can be replaced with any basic non-aromatic primary or secondary amine such as pointed out above in connection with reaction with compounds of Formulas IIa and IIb. Likewise, the acetanilido-Δ¹,³-butadienyl ethiodides can be replaced with other quaternary salts, e. g., butiodides, propobromides, alkylsulfates, alkyltoluenesulfonates or the like. Likewise, acylanilido-Δ¹,³-butadienyl derivatives of 4-methylthiazole, 4-phenylthiazole, 4-methyloxazole, 4-phenyloxazole, 4,5-diphenylthiazole, 4-phenylselenazole, thiazoline, selenazoline, 3,3-dialkylindolenine or the like quaternary salts can be reacted with primary or secondary basic non-aromatic amines.

The following examples will serve to illustrate the mode of preparation of our new dyes of Formulas IIa and IIb where *n* equals three. These examples are not intended to limit our invention.

EXAMPLE 26.—*1-[6-(1-piperidyl)-Δ¹,³,⁵-hexatrienyl]-benzothiazole ethiodide*

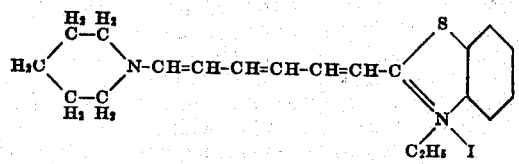

1.25 g. (1 mol.) of 1-(6-acetanilido-Δ¹,³,⁵-hexatrienyl)-benzothiazole ethiodide, 0.6 g. (3 mol.) of piperidine and 10 cc. of absolute ethyl alcohol were mixed and allowed to stand at room temperature (20° to 25° C.) for about 15 minutes. The dye separated and was filtered off and dissolved from the impurities by extraction with hot ethyl alcohol. It was recrystallized a second time from ethyl alcohol and obtained as dark blue crystals melting at 120.5° to 123.5° C. with decomposition. Its ethyl alcoholic solution was purple.

The 1-(6-acetanilido-Δ¹,³,⁵-hextrienyl) benzothiazole ethiodide was prepared as follows: 12.2 g. (1 mol.) of 1-methylbenzothiazole ethiodide, 11.4 g. (1 mol.) of glutaconic aldehyde dianilide hydrochloride and 50 cc. of acetic anhydride were heated to refluxing for about 10 minutes.

The product was washed with water and used without further purification.

EXAMPLE 27.—1-[6-(4-morpholyl)-Δ¹,³,⁵-hexatrienyl]-benzothiazole ethiodide

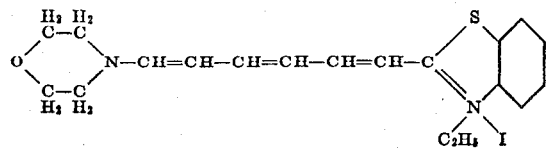

1.25 g. (1 mol.) of 1-(6-acetanilido-Δ¹,³,⁵-hexatrienyl)-benzothiazole ethiodide, 0.7 g. (3 mol.) of morpholine and 15 cc. of absolute ethyl alcohol were mixed and allowed to stand at 20° to 25° C. for about ten minutes. The dye separated and was dissolved from the impurities by extraction with hot methyl alcohol. After a second recrystallization from methyl alcohol, the dye was obtained as dark blue crystals melting at 154.5° to 156.5° C. with decomposition. Its methyl alcoholic solution was purple.

In the above two examples, the piperidine and morpholine can be replaced by any basic non-aromatic primary or secondary amine such as pointed out above in connection with reaction with compounds of Formulas IIa and IIb. Likewise, the acetanilido-Δ¹,³,⁵-hexatrienyl ethiodides can be replaced with other quaternary salts, e. g., butiodides, propobromides, alkylsulfates, alkyltoluenesulfonates or the like. Likewise, acylanilido derivatives of other quaternary salts such as pointed out above in Formulas IIa and IIb can be reacted with primary or secondary non-aromatic basic amines.

We have found it advantageous to obtain our new dyes in the form of the dye-iodides in most instances. The dye-iodides are also a satisfactory form of our new dyes to employ in preparing sensitized photographic emulsions, we have found. However, the dye-iodides can be converted into other dye-salts. For instance, in Example 16, the dye-iodide was converted into the less soluble dye perchlorate by treatment with sodium perchlorate. Our dye-iodides can be converted into dye chlorides by dissolving the dye-iodides in methyl alcohol or other suitable solvent, adding an excess of freshly prepared silver chloride to the solution and refluxing the mixture for several hours. The silver iodide formed is filtrated off and the resulting solution concentrated and chilled to precipitate the dye-chloride.

In the above examples, heating under reflux is intended to mean heating the reaction mixture to moderate boiling under reflux.

Still further examples of the preparation of our new dyes could be cited, but the foregoing will be sufficient to teach those skilled in the art the manner of obtaining our new dyes.

Our new dyes, particularly those where $n$ represents one or two, can be employed in manufacturing light filters and to color cellulose acetate yarn, i. e. cellulose acetate silk.

Our new dyes can be called hemicyanine dyes. Those containing a chain of two methenyl groups (where $n$ in Formulas Ia and Ib represents one) can be called hemicarbocyanine dyes; those containing a chain of four methenyl groups (where $n$ represents two) can be called hemidicarbocyanine dyes; and those containing a chain of six methenyl groups (where $n$ represents three) can be called hemitricarbocyanine dyes.

Our new hemicyanine dyes give rise to photographic emulsions possessing novel sensitivity, when incorporated therein. Our invention is particularly directed to the customarily employed gelatino-silver-halide emulsions. However, our new hemicyanine dyes can be employed in emulsions in which the carrier is other than gelatin, for example, a resinous substance or cellulosic derivative which has substantially no deleterious effect on the light-sensitive materials. As silver halide emulsions, we include such emulsions as are commonly employed in the art, for example, silver chloride or silver bromide emulsions which can contain other salts which may be light sensitive. Our hemicarbocyanine dyes (where $n$ represents one) are advantageously employed with silver chloride emulsions. Our hemidicarbocyanine dyes are likewise advantageously employed with silver chloride emulsions (see United States Patent 2,166,736, dated July 18, 1939).

What we claim as our invention and desire to be secured by Letters Patent of the United States is:

1. As a new product, a dye of one of the following formulas:

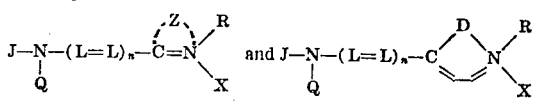

wherein D represents a divalent group selected from the group consisting of vinylene and phenylene groups, L represents a methenyl group, $n$ represents a positive integer not greater than three, J represents a member selected from the group consisting of hydrogen and alkyl groups, while Q represents an alkyl group and J and Q together represent the non-metallic atoms necessary to complete a saturated organic basic mono-cyclic nucleus, R represents an alkyl group, X represents an acid radical and Z represents the non-metallic atoms necessary to complete an organic heterocyclic nucleus.

2. As a new product, a dye of one of the following general formulas:

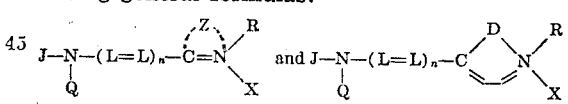

wherein D represents a divalent group selected from the group consisting of vinylene and phenylene groups, L represents a methenyl group, $n$ represents a positive integer not greater than three, J represents a member selected from the group consisting of hydrogen and alkyl groups, while Q represents an alkyl group and J and Q together represent the non-metallic atoms necessary to complete a saturated organic basic mono-cyclic nucleus, R represents an alkyl group, X represents an acid radical and Z represents the non-metallic atoms necessary to complete an organic heterocyclic nucleus selected from the group consisting of five-membered and six-membered organic heterocyclic nuclei.

3. As a new product, a dye of the following general formula:

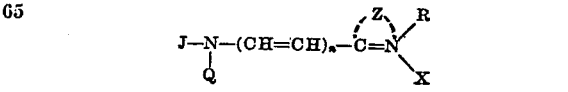

wherein $n$ represents a positive integer not greater than three, J and Q together represent the non-metallic atoms necessary to complete a six-membered, saturated organic basic mono-cyclic nucleus, R represents an alkyl group, X represents an acid radical and Z represents the non-metallic atoms necessary to complete an organic heterocyclic nucleus selected from the group consisting of five-membered and six-membered organic heterocyclic nuclei.

4. As a new product, a dye of the following formula:

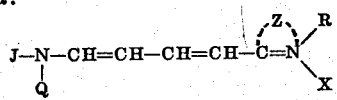

where J and Q together represent the non-metallic atoms necessary to complete a piperidyl nucleus, R represents an alkyl group, X represents an acid radical and Z represents the non-metallic atoms necessary to complete a heterocyclic nucleus of the thiazole series.

5. As a new product, a dye of the following formula:

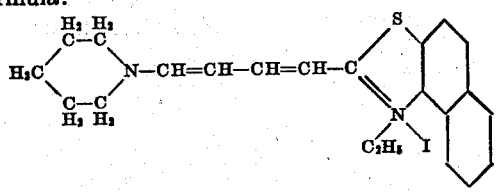

6. As a new product, a dye of the following formula:

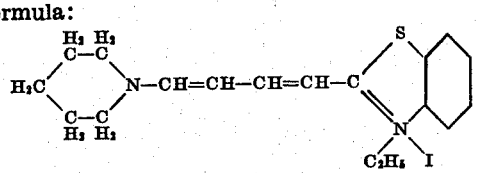

7. As a new product, a dye of the following formula:

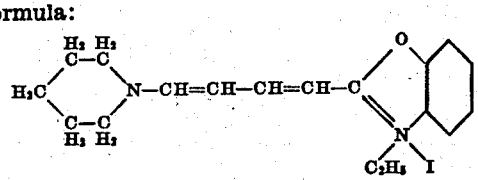

8. A process for preparing a hemicyanine dye comprising reacting an amine selected from the group consisting of basic non-aromatic primary and secondary amines other than pyrrol with a compound of one of the following formulas:

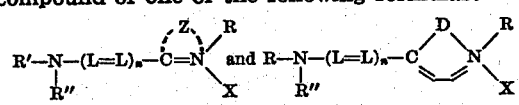

wherein D represents a divalent group selected from the group consisting of vinylene and phenylene groups, n represents a positive integer not greater than three, L represents a methenyl group, R represents an alkyl group, R' represents an acyl group, R" represents an aryl group, X represents an acid radical and Z represents the non-metallic atoms necessary to complete an organic heterocyclic nucleus.

9. A process for preparing a hemicyanine dye comprising reacting a monoamine selected from the group consisting of basic non-aromatic primary and secondary monoamines other than pyrrol with a compound of one of the following formulas:

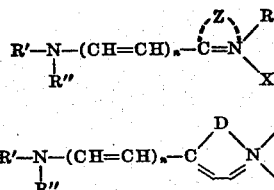

and

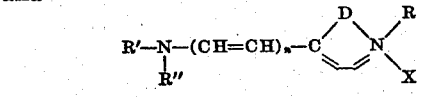

wherein D represents a divalent group selected from the group consisting of vinylene and phenylene groups, n represents a positive integer not greater than three, R represents an alkyl group, R' represents an acyl group, R" represents an aryl group, X represents an acid radical and Z represents the non-metallic atoms necessary to complete an organic heterocyclic nucleus selected from the group consisting of five-membered and six-membered heterocyclic nuclei.

10. A process for preparing a hemicyanine dye comprising reacting a monoamine selected from the group consisting of basic non-aromatic primary and secondary monoamines other than pyrrol with a compound of the following formula:

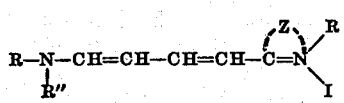

wherein R represents an alkyl group, R' represents an acetyl group, R" represents a phenyl group and Z represents the non-metallic atoms necessary to complete an organic heterocyclic nucleus selected from the group consisting of five-membered and six-membered heterocyclic nuclei.

11. A process for preparing a hemicyanine dye comprising reacting from about one and one-half to about three molecular proportions of an amine selected from the group consisting of basic non-aromatic primary and secondary amines other than pyrrol with about one molecular proportion of a compound of one of the following formulas:

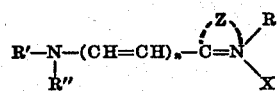

and

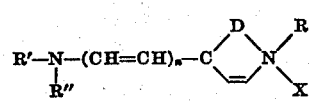

wherein D represents a divalent group selected from the group consisting of vinylene and phenylene groups, n represents a positive integer not greater than three, L represents a methenyl group, R represents an alkyl group, R' represents an acyl group, R" represents an aryl group, X represents an acid radical and Z represents the non-metallic atoms necessary to complete an organic heterocyclic nucleus selected from the group consisting of five-membered and six-membered heterocyclic nuclei.

12. A process for preparing a hemicyanine dye comprising reacting from about one and one-half to about three molecular proportions of a monoamine selected from the group consisting of non-aromatic primary and secondary monoamines other than pyrrol with a compound of the following formula:

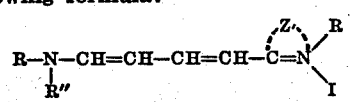

wherein R represents an alkyl group, R' represents an acetyl group, R" represents a phenyl group and Z represents the non-metallic atoms necessary to complete an organic heterocyclic nucleus selected from the group consisting of five-membered and six-membered heterocyclic nuclei.

13. As a new product, a dye of the following formula:

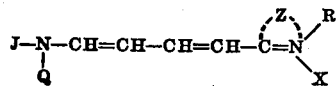

wherein J represents a monovalent group selected from the group consisting of hydrogen and alkyl groups while Q represents an alkyl group, and J and Q together represent the non-metallic atoms necessary to complete a saturated organic basic mono-cyclic nucleus selected from the group consisting of five-membered and six-membered saturated organic basic mono-cyclic nuclei, R represents an alkyl group, X represents an acid radical and Z represents the non-metallic atoms necessary to complete an organic heterocyclic nucleus selected from the group consisting of five-membered and six-membered organic heterocyclic nuclei.

14. As a new product, a dye of the following formula:

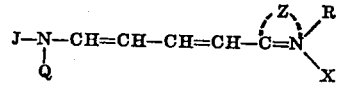

wherein J and Q together represent the non-metallic atoms necessary to complete a six-membered saturated organic mono-cyclic basic nucleus, R represents an alkyl group, X represents an acid radical and Z represents the non-metallic atoms necessary to complete an azole nucleus.

FRANK L. WHITE.
GRAFTON H. KEYES.